W. W. FARNSWORTH.
MEANS FOR AUTOMATICALLY APPLYING TIRE CHAINS TO VEHICLE WHEELS.
APPLICATION FILED MAR. 1, 1917. RENEWED MAY 5, 1920.
1,351,206.      Patented Aug. 31, 1920.
2 SHEETS—SHEET 2.
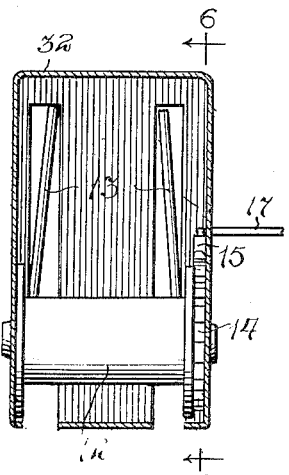
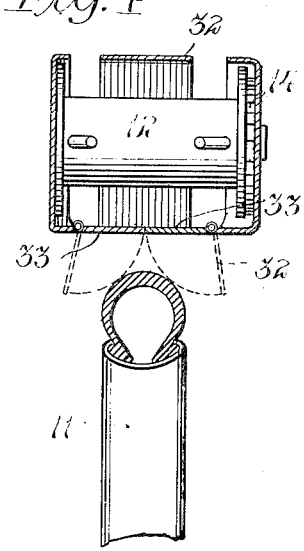
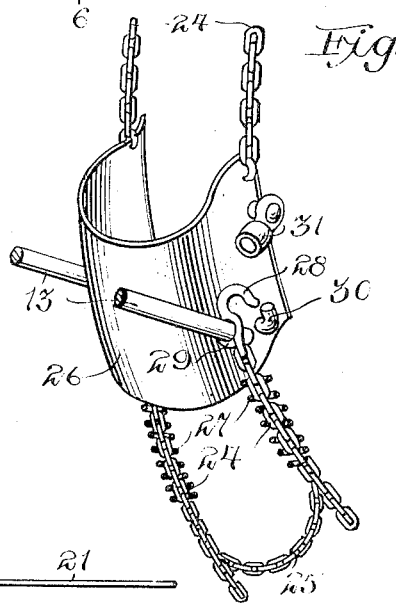
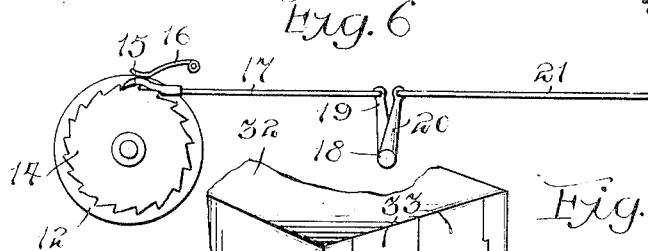
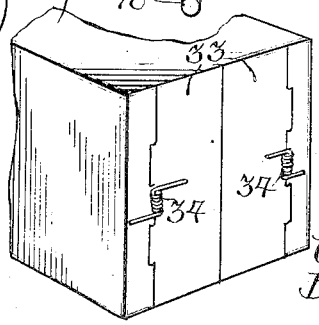
Inventor
William W. Farnsworth.
By:
Atty.

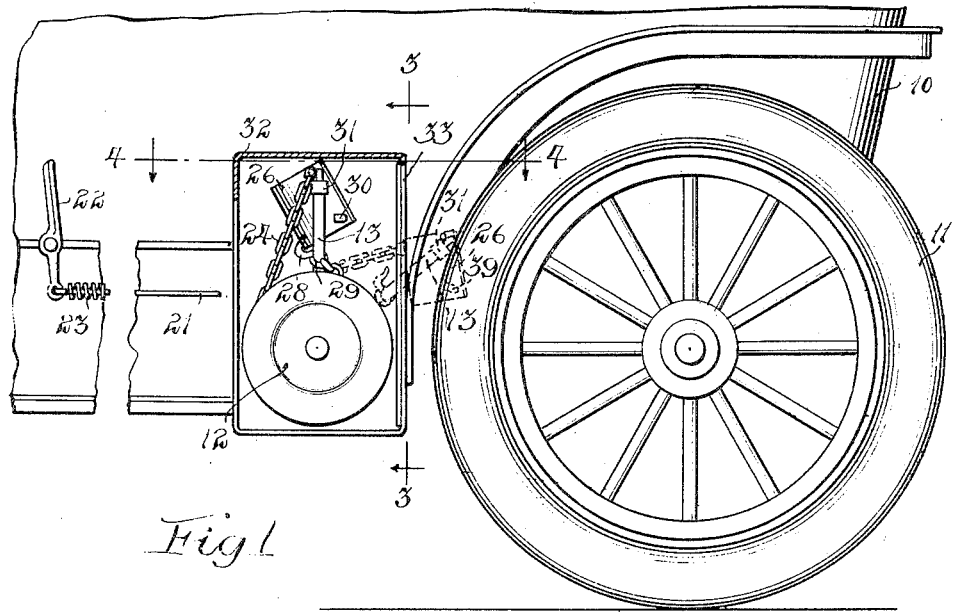
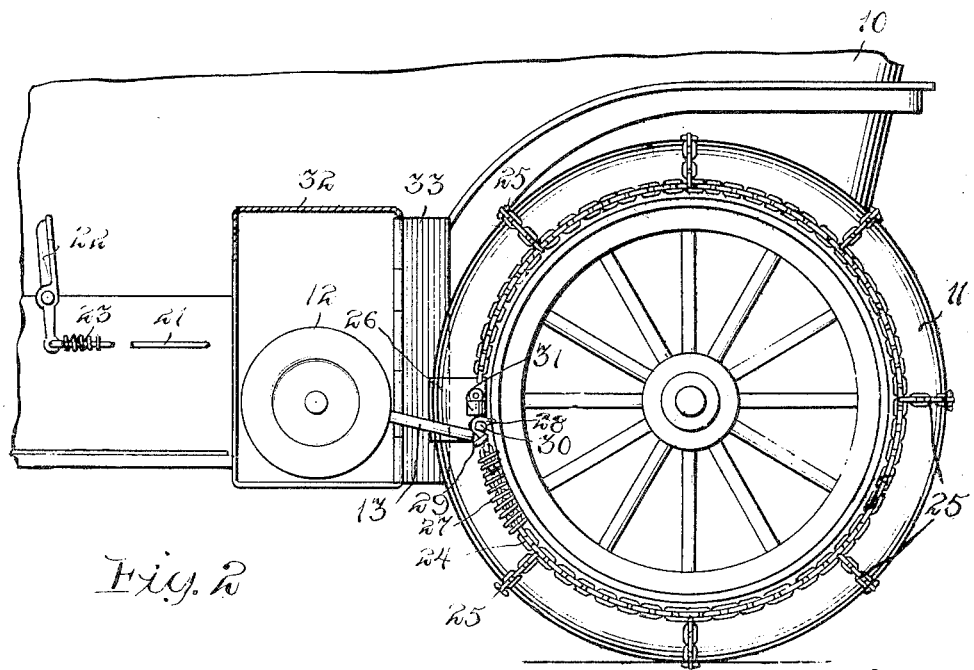

UNITED STATES PATENT OFFICE.

WILLIAM W. FARNSWORTH, OF LITTLETON, COLORADO, ASSIGNOR OF ONE-THIRD TO EDWARD A. RYAN, OF KANSAS CITY, MISSOURI, AND ONE-THIRD TO EDWARD H. WHITE, OF CUMBERLAND, MARYLAND.

MEANS FOR AUTOMATICALLY APPLYING TIRE-CHAINS TO VEHICLE-WHEELS.

1,351,206.      Specification of Letters Patent.     Patented Aug. 31, 1920.

Application filed March 1, 1917, Serial No. 151,636. Renewed May 5, 1920. Serial No. 379,178.

*To all whom it may concern:*

Be it known that I, WILLIAM W. FARNSWORTH, a citizen of the United States, residing at Littleton, in the county of Arapahoe and State of Colorado, have invented certain new and useful Improvements in Means for Automatically Applying Tire-Chains to Vehicle-Wheels, of which the following is a specification.

This invention relates to improvements in means for automatically applying to the wheel of a vehicle an anti-skid chain, and while the wheel is in motion, and one of the objects of the invention is to provide improved means of this character compactly arranged, and which will be easy of operation by the operator, and without necessitating his leaving his seat.

A further object is to provide improved means of this character whereby the chain will be held out of the way when not in use, and which will at the same time present the chain to the wheel when it is to be applied thereon.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating the invention and in which,—

Figure 1 is a side elevation of a portion of a vehicle showing a tire chain attaching means applied thereto, constructed in accordance with the principles of this invention.

Fig. 2 is a view similar to Fig. 1 showing another position of the parts.

Fig. 3 is a view partly in vertical section and partly in elevation of the chain carrier and housing therefor.

Fig. 4 is a detail horizontal sectional view taken on line 4—4, Fig. 1.

Fig. 5 is a detail perspective view of the clip which is attached to the chain and showing the position of some of the other parts in relation to the clip while the chain is being delivered to the wheel.

Fig. 6 is a detail view of the actuating means for operating the tire applying device and as taken on line 6—6, Fig. 3.

Fig. 7 is a detail perspective view of one end of the housing in which the applying means is arranged and also in which the chain is housed when the chain is supported by the delivery mechanism.

Referring more particularly to the drawing, the numeral 10 designates a vehicle and 11 one of the wheels thereof to which the anti-skid chain is to be attached. Mounted in any suitable position with respect to the wheel 11 and upon the vehicle is a drum or spool 12, which is provided with spaced radially projecting arms 13 which preferably taper from the drum toward the extremity of the arms, and connected with the drum 12 is a ratchet wheel 14 that is adapted to be actuated by means of a pawl 15 which latter is held by means of a spring 16 in contact with the ratchet wheel, and the pawl is connected with the arm 17. The pawl 15 is preferably offset laterally with respect to the arm 17 and the arm is connected with a rock shaft 18 by means of another arm 19. A second arm 20 is connected with the rock shaft 18 and this arm 20 in turn is connected with a bar rod 21, that is adapted to be actuated by a treadle 22 arranged in a convenient position for the operator. A spring 23 may be provided for the purpose of returning the treadle 22. Thus it will be seen that when the treadle 22 is actuated, the pawl 15 will be operated and through the medium of the ratchet wheel 14, will rotate the drum 12 and with it the arms 13, and the drum may be rotated sufficiently to cause a complete rotation thereof, as well as of the arms 13. The tire chain preferably comprises side members 24 which are connected by cross members 25 to extend across the tread of the tire. One of the ends of each of the side members 24 is preferably connected with a spring clip 26 of any desired size and configuration, preferably constructed of spring material adapted to be placed over the tread of the tire, so as to grip the tire and secure one end of the side chains 24 to the tire. Arranged within the length of the side chains 24 are springs 27 which are adapted to take up the slack of the side chains and cause the chain to be held taut.

Connected with the other end of each of the chains 24 is a hook member 28 which may also be of any desired size and configuration and these hook members are each provided with an eyelet 29.

The clip 26 is provided on each side thereof and adjacent one end with a projecting lug 30 over which the hook 28 is adapted to be passed in a manner hereinafter to be set forth for securing the ends of the chains together and for holding the chain upon the tire. Secured also to the member 26 on each side thereof and at suitable points are socket members 31, which are preferably pivotally connected with the member 26, and these sockets 31 are adapted to respectively receive the extremities of the arms 13.

The chain is placed upon the applying mechanism by first passing the eyelets 29 of the hooks 28 over the respective arms 13, as shown more clearly in Figs. 1 and 5, after which the drum 12 is rotated by the pawl and ratchet mechanism to cause the chain to be wound thereon. This will cause the member 26 to stand between the arms 13 so that the socket 31 may be placed over the ends of the arms 13, as shown in Fig. 1.

In this position the chain will be ready to be delivered to the wheel. The drum 12 is held against rotation by a certain amount of friction between the parts and also by the pawl and ratchet 14, 15. This pawl and ratchet also serve the function of operating the drum.

With the parts in the position as shown in Fig. 1 and when it is desired to deliver the chain to, and apply the same upon the wheel 11, the operator simply actuates the treadle 22 until the drum 12 is rotated so that the parts will be moved from the full line to the dotted line position. When the member 26 reaches the dotted line position in Fig. 1, it will, owing to its springy nature, yield sufficiently to permit the member to be sprung upon the tire. The rotation of the wheel 11, having the member 26 attached thereto, will cause the chains 24 to be unwound from the drum 12 and the latter will rotate under the stress of the chain being drawn therefrom to permit this operation. By the time the parts reach the position shown in Fig. 2, the member 26 will have assumed a position that the lugs 30 and the arms 13 of the drum will be adjacent each other and the downward inclination of the arms 13 will permit the hooked members 28 to be pulled down, from the arms and drop upon the lugs 30 to automatically lock or secure the ends of the chains together. After the chain has been delivered from the arms 13, the operator may then actuate the foot treadle 22 to further rotate the drum 12 and move the arms 13 out of the way.

In order to protect the chain and the applying means, a suitable housing designated generally by the reference numeral 32 may be provided, in which the drum 12 and the arms 13 operate. This housing 32 is provided with an open side adjacent the periphery of the wheel 11 and doors 33 are provided for maintaining the opening closed. This prevents the wheel from throwing mud, etc., upon the chain when it is wound upon the drum. The doors 33 are preferably spring controlled for which purpose suitable springs 34 may be provided and the normal tendency of these springs is to close the doors or hold them in the positions shown in Figs. 4 and 7.

When it is desired to apply the chain to the wheel, the actuation of the drum 12 will cause the arms 13 and the member 26 supported thereby, to move against the doors from the inside and a further action of the drum will cause the doors to be opened by the arms and after the arms and the chain have passed out of engagement with the doors 33, the latter will automatically close.

With this improved construction, it will be manifest that the chain may be automatically applied to the tire or the wheel while the vehicle is in motion, and the parts will not only be compactly arranged, but the drum and arms will serve the further function of holding the chain when not in use, in a manner so that the chain may be readily applied to the wheel whenever desired. The springs 27 in the chain serve the further function of holding the hooks 28 in engagement with the lugs 30. Obviously the hooks and lugs may be of any desired construction suitable for the purpose.

While the preferred form of the invention has been herein shown and described, it is to be understood that many changes may be made in the details of construction and in the combination and arrangement of the several parts without departing from the spirit of this invention, and for this reason, it is desired that the drawings herewith submitted shall be considered as being merely diagrammatic.

What is claimed as new is:

1. Means for automatically applying an anti-skid chain to a vehicle wheel, embodying a carrier for the chain, and means for actuating the carrier to wind the chain about the wheel and deliver the chain entirely from the carrier, the first recited means also operating to inter-fasten both ends of the chain upon the wheel and at any point about the circumference of the wheel.

2. Means for automatically applying an anti-skid chain to a vehicle wheel and while the wheel is in motion, embodying a carrier for the chain and means for actuating the carrier whereby the chain will be wound about the wheel and entirely delivered from the carrier to the wheel and both ends fastened directly together upon the wheel at any point about the periphery of the wheel.

3. Means for automatically applying an anti-skid chain to a vehicle wheel and while the vehicle is in motion, embodying a carrier for the chain, and means for actuating the chain from the vehicle at will, whereby the chain will be wound about the wheel and entirely delivered from the carrier to the wheel, and the ends of the chain will be connected directly together at any point about the periphery of the wheel.

4. Means for automatically applying an anti-skid chain to a vehicle wheel and embodying a carrier for the chain, said carrier embodying means for holding both ends of the chain, and means for actuating the carrier to present one end of the chain to the wheel and at any point about the periphery of the wheel, said carrier also operating to present the other end of the chain to the wheel and adjacent the first recited end and to automatically secure the two ends of the chain directly together.

5. Means for automatically applying an anti-skid chain to a vehicle wheel and embodying a carrier for the chain, said carrier embodying means for holding both ends of the chain, and means for actuating the carrier to present one end of the chain to the wheel and at any point about the periphery of the wheel, said carrier also operating to present the other end of the chain to the wheel and adjacent the first recited end and to automatically secure the ends of the chain directly together, said actuating means also operating to hold the carrier in position.

6. Means for automatically applying an anti-skid chain to a vehicle wheel, embodying a carrier for the chain, means for actuating the carrier whereby the chain will be entirely delivered from the carrier to be wound about the wheel, and means for housing and protecting said carrier and the chain while the latter is held by the carrier, the first recited means also embodying provisions operating to position both ends of the chain upon the wheel.

7. Means for automatically applying an anti-skid chain to a vehicle wheel, embodying a carrier for the chain, means for actuating the carrier whereby the chain will be entirely delivered from the carrier to be wound about the wheel, means for housing and protecting said carrier, the last recited means embodying a casing having an opening through which the chain is delivered to the wheel, and a closure for the opening, the first recited means embodying provisions operating to position both ends of the chain upon the wheel.

8. Means for automatically applying an anti-skid chain to a vehicle wheel, embodying a carrier for the chain, means for actuating the carrier, means for housing and protecting said carrier and the chain while the latter is held by the carrier, the last recited means embodying a casing having an opening through which the chain is delivered to the wheel, and a closure for the opening, said closure being adapted to be automatically opened, by the actuation of the carrier.

9. Means for automatically applying an anti-skid chain to a vehicle wheel, embodying a carrier for the chain and means for actuating the carrier, said carrier embodying a drum about which the chain is wound, and an arm with which both ends of the chain have connection and from which arms the ends of the chain are automatically detachable.

10. Means for automatically applying an anti-skid chain to a vehicle wheel, embodying a carrier for the chain and means for actuating the carrier, said carrier embodying a drum about which the chain is wound, and an arm with which the ends of the chain have detachable engagement, said arm also operating to deliver one end of the chain to the wheel adjacent the other end of the chain in such a manner as to automatically secure the ends of the chain together.

11. The combination of an anti-skid chain, said chain embodying a clip at one end and a catch at the other end adapted to coöperate with the clip whereby the two ends of the chain may be secured directly together, and means for automatically applying the chain to the wheel, the said means embodying a carrier for the chain, and means for actuating the carrier, said carrier operating to deliver one end of the chain to the wheel and at any point about the periphery of the wheel to cause the clip to engage the wheel, and also operating to deliver the other end of the chain to the wheel and to connect the catch with the first mentioned end of the chain for securing the ends together.

12. The combination of an anti-skid chain, a catch at one end of the chain, a catch engaging portion at the other end of the chain, and means for automatically applying the chain to the wheel, the said means embodying a carrier for the chain, said carrier embodying an arm to which the ends of the chain are detachably connected, and means for actuating the carrier at will, said arm operating to deliver one end of the chain to the wheel, and also operating to form a guide for the catch for directing the catch into engagement with the said catch engaging part for securing the ends of the chain together.

13. The combination of an anti-skid chain, a catch at one end of the chain, a catch engaging portion at the other end of the chain, and means for automatically applying the chain to the wheel, the said means embodying a carrier for the chain, said carrier embodying an arm to which the ends of the chain are detachably connected, means for actuating the carrier at will, said arm operating to deliver one end of the chain to the wheel, and also operating to form a guide for the catch for directing the catch into engagement with the said catch engaging portion for securing the ends of the chain together, and means for housing and protecting the chain and carrier.

14. The combination of an anti-skid chain, a catch at one end of the chain, a catch engaging portion at the other end of the chain, and means for automatically applying the chain to the wheel, the said means embodying a carrier for the chain, said carrier embodying an arm to which the ends of the chain are detachably connected, means for actuating the carrier at will, said arm operating to deliver one end of the chain to the wheel, and also operating to form a guide for the catch for directing the catch into engagement with the said catch engaging portion for securing the ends of the chain together, and means for housing and protecting the chain and carrier, said housing having an opening through which the chain is delivered to the wheel, and a closure for the opening, said closure adapted to be opened by the actuation of the said carrier.

15. A tire chain, coöperating means at the ends of the chain for connecting said ends together, a support for the chain, securing means connected with the chain for connecting one end of the chain to a vehicle wheel and at any point about the periphery of the wheel, whereby the wheel will draw the chain from the support, and means for attaching said securing means to the wheel, the last recited means also operating to cause the ends of the chain to be directly connected.

16. A tire chain, coöperating means at the ends of the chain for connecting said ends together, a support for the chain, said support embodying a rotatable drum upon which the chain is adapted to be wound, securing means connected with the chain for connecting one end of the chain to a vehicle wheel, whereby the wheel will draw the chain from the support, and means for attaching said securing means to the wheel, the last recited means also operating to cause the ends of the chain to be connected.

17. The combination of a vehicle body, and a chain carriage on the body, said carriage embodying a movable element and said element embodying means for delivering the chain to the wheel to be wound thereabout and for securing the ends of the chain directly together upon and at any point about the periphery of the wheel.

18. The combination of a vehicle body, and a chain carriage on the body, said carriage embodying a movable element to which both ends of the chain are detachably connected, and said element embodying means for delivering the chain to the wheel to be wound thereabout and for securing the ends of the chain together upon the wheel.

19. The combination of a vehicle body, a chain carriage on the body, said carriage embodying a movable element and said element embodying means for delivering the chain to the wheel to be wound thereabout and for securing the ends of the chain directly together upon the wheel at any point about the periphery of the wheel, and means for actuating the said element.

20. The combination of a vehicle wheel, a tire chain therefor, said chain having means at its opposite ends for connecting the ends of the chain together, means for supporting the chain when not in use, the said means at the one end of the chain embodying provision for connecting said end to the wheel whereby the rotation of the wheel will draw the chain from the supporting means, and means for automatically connecting the ends of the chain upon the wheel.

21. The combination of a vehicle wheel, a tire chain therefor, said chain having means at its opposite ends for connecting the ends of the chain together, means for supporting the chain when not in use, the said means at one end of the chain embodying provision for connecting the said end to the wheel whereby the rotation of the wheel will draw the chain from the supporting means, means for actuating the said chain and supporting means to position one end of the chain to engage the wheel, and means for automatically connecting the ends of the chain upon the wheel.

22. The combination with a vehicle body, of a chain carriage on the body, comprising a movable member, and means for causing the said member to fasten the ends of a chain directly together upon a vehicle wheel and at any point about the periphery of the wheel.

23. Means for automatically applying an anti-skid chain to a vehicle wheel to be wound thereabout and for securing together the ends of the chain at any point about the periphery of the wheel, and embodying means for receiving and holding the chain when not in use.

24. Means for automatically applying an anti-skid chain to a vehicle wheel to be wound thereabout and for securing together the ends of the chain at any point about the periphery of the wheel and while the vehicle is in motion, and embodying means for receiving and holding the chain when not in use.

25. Means for automatically applying an anti-skid chain to a vehicle wheel to be wound thereabout and for securing together the ends of the chain at any point about the periphery of the wheel, and embodying means for receiving the chain when not in use and holding the chain in a position that the ends of the chain will be presented to the wheel one in advance of the other.

26. Means for automatically applying an anti-skid chain to a vehicle wheel and while the vehicle is in motion, embodying a carrier for the chain, and means for actuating the chain from the vehicle at will, whereby the chain will be wound about the wheel and the ends of the chain will be connected directly together and at any point about the wheel.

In testimony whereof I have signed my name to this specification, in the presence of two subscribing witnesses, on this 15th day of February, A. D. 1917.

WILLIAM W. FARNSWORTH.

Witnesses:
M. LANGDON,
JOS. A. HABERBOSCH.